No. 816,445.
PATENTED MAR. 27, 1906.
F. W. FELSBERG.
STUFFING BOX.
APPLICATION FILED JUNE 14, 1905.
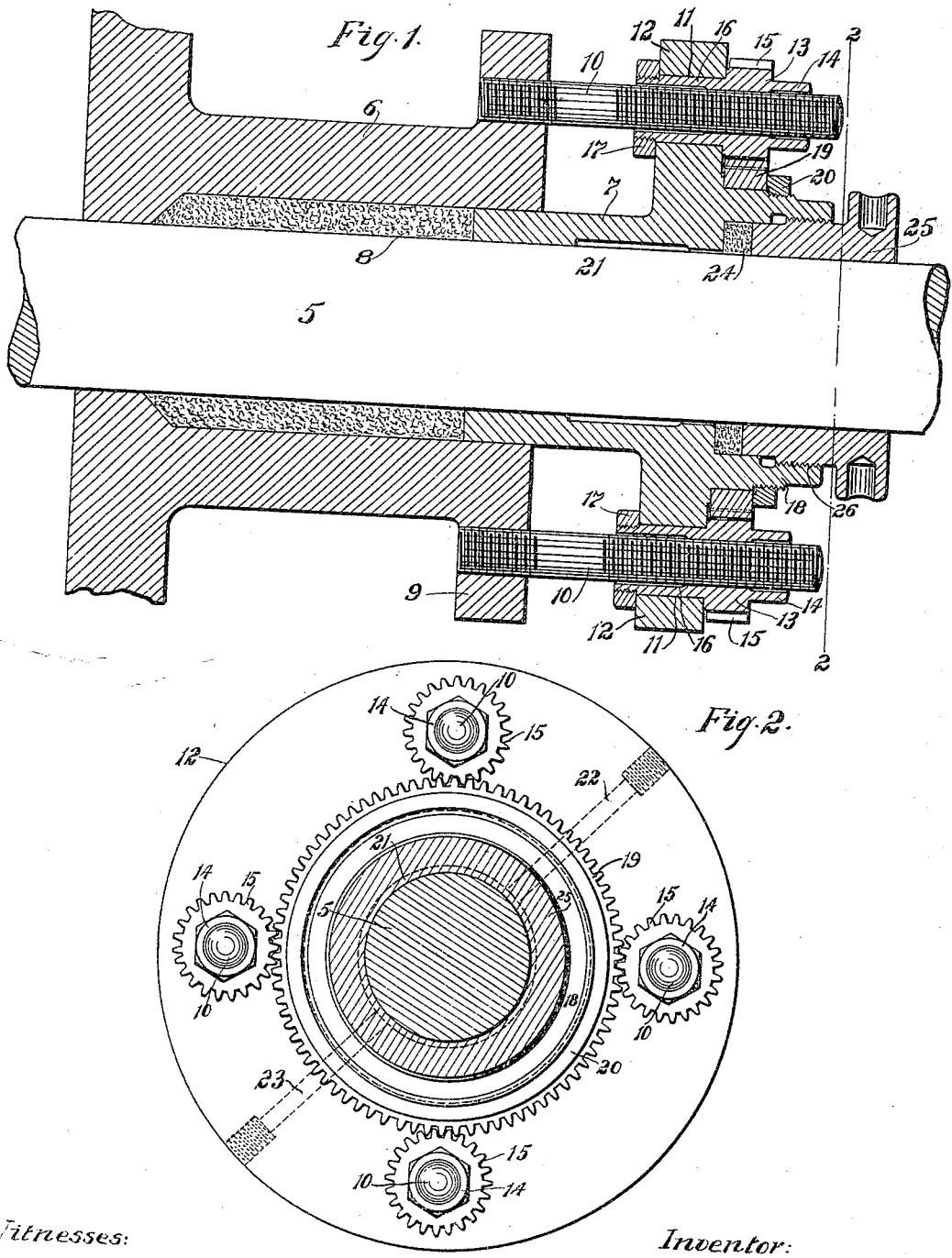

UNITED STATES PATENT OFFICE.

FREDERICK W. FELSBERG, OF DAYTON, KENTUCKY.

STUFFING-BOX.

No. 816,445.        Specification of Letters Patent.       Patented March 27, 1906.

Application filed June 14, 1905. Serial No. 265,151.

*To all whom it may concern:*

Be it known that I, FREDERICK W. FELSBERG, a citizen of the United States, residing at Dayton, in the county of Campbell and State of Kentucky, have invented certain new and useful Improvements in Stuffing-Boxes, of which the following is a full, clear, and exact specification.

My invention relates to improvements in stuffing-boxes, and particularly to such as are employed on the piston-rods of large compressors of refrigerating-machines.

In large stuffing-boxes in which a plurality of fastening-bolts are depended upon to move the stuffing-box gland into its proper position considerable difficulty has been experienced, due to an irregular or ununiform feeding forward of said gland. It is a slow and laborious process to tighten up on the bolts one by one by means of a wrench, and it often happens that one side is moved faster than the other and the gland is canted over and scratches or dents the piston-rod. When the piston-rod of a large ammonia-compressor becomes dented or scratched to any great extent, it is impossible to prevent leakage of the ammonia-gas from said compressor, and considerable damage is liable to result from this leaking gas. Furthermore, when the gland is canted over by an irregular feeding forward of all parts of same the packing in the stuffing-box is improperly compressed, and the ammonia-gas is quite likely to leak through said packing.

The object of my invention is to reduce the time and labor necessary to adjust the gland of the stuffing-box and also to prevent the escape of gas and to prevent damage to the machine due to an irregular feeding forward of said gland.

In carrying out the object of my invention I provide a stuffing-box with a gland having openings in its flange through which pass threaded bolts, said bolts projecting from the stuffing-box casing and carrying nuts bearing against said flange in combination with means, such as gearing, for transmitting equally to all of said nuts a movement imparted to any one of them.

The invention will be more clearly understood by reference to the accompanying drawings, which illustrate the preferred embodiment of my invention.

In said drawings, Figure 1 is a longitudinal sectional view through my improved stuffing-box. Fig. 2 is a sectional view on the line 2 2 of Fig. 1.

Referring now to the drawings, the piston-rod of the machine is illustrated at 5, the casing of the stuffing-box at 6, and the gland of said stuffing-box at 7. The piston-rod is surrounded by the packing 8 in the stuffing-box. The flange 9 of the casing 6 is provided with a plurality of projecting bolts 10, which are fixed against rotation in said flange 9. These bolts 10 pass through openings 11 in the flange 12 of the gland 7, and each has mounted thereon gear-nut 13, which is provided with an irregular-shaped head 14, a gear-wheel 15, and a projecting sleeve 16, which fits the opening 11 in flange 12 and forms a bearing for said nut in the gland 7. The projecting sleeve, which rotates freely in said opening, is provided with the nut 17, which holds the gear-nut in place in its bearing. Rotatably mounted on the annular projection 18 of gland 7 is an idler-gear 19, which meshes with all the gears 15 of the gear-nuts 13. This gear 19 is held in place on said projection by means of the nut 20. To lubricate the stuffing-box, oil is fed to the annular chamber 21 through the passage-way 22 and leaves said chamber through the passage-way 23. To prevent the oil from leaking from said chamber, an auxiliary stuffing-box is provided. The latter stuffing-box comprises the packing 24 and the gland 25, threaded into the annular projection 18 at 26.

In adjusting my improved stuffing-box when feeding the gland 7 forward or back it is merely necessary to apply a wrench or other tool to the irregular-shaped head 14 of any one of the gear-nuts 13, and the rotary movement imparted to said nut will be transmitted equally to all the gear-nuts, so that all parts of the gland will be moved parallel with the piston-rod at a uniform rate. This arrangement prevents canting or twisting of said gland, and therefore causes the packing to be uniformly compressed around the rod and prevents all damage to the machine due to such canting or twisting. Any desirable means may be employed for moving all parts of said gland forward at a uniform rate, and I therefore do not limit my invention in the appended claims to the specific mechanism herein shown and described.

Having thus described my invention, what I claim as new, and desire to secure by Letters Patent, is—

1. In a stuffing-box, a casing, a plurality of threaded bolts fixed therein and projecting therefrom, a gland provided with a flange having openings through which said bolts project, nuts rotatably mounted on said bolts and bearing against said flange, and means for transmitting equally to all of said nuts movement imparted to any one of them, whereby all parts of said gland are moved forward at a uniform rate.

2. In a stuffing-box, a casing, a plurality of threaded bolts rigidly fastened thereto and projecting therefrom, a gland provided with a flange having openings through which said bolts project, nuts rotatably mounted on said bolts and bearing against said flange, and means for gearing said nuts together so that a rotary movement imparted to any one of the nuts will be transmitted to all and all parts of the gland will be moved at a uniform rate.

3. A stuffing-box consisting of a casing provided with a flange, a plurality of threaded bolts projecting from said flange, a gland, a plurality of gear-nuts carried by said gland and rotatably mounted on said bolts, and an idler-gear meshing with all of said gear-nuts and mounted upon said gland in such a manner that a rotary movement imparted to any one of said gear-nuts is transmitted to all.

4. In combination, a piston-rod, a stuffing-box for said piston-rod, consisting of a casing having a plurality of fixed threaded bolts projecting therefrom, a gland, a plurality of gear-nuts rotatably mounted on said bolts and in said gland, an idler-gear concentric with said shaft and meshing with said gear-nuts, the arrangement being such that all parts of said gland will be moved a uniform distance parallel to said shaft when a rotary movement is given to any one of said nuts.

In testimony whereof I hereby affix my signature in the presence of two witnesses.

FREDERICK W. FELSBERG.

Witnesses:
 EDW. MAULINIER,
 J. S. LOUIS.